Figure 2:
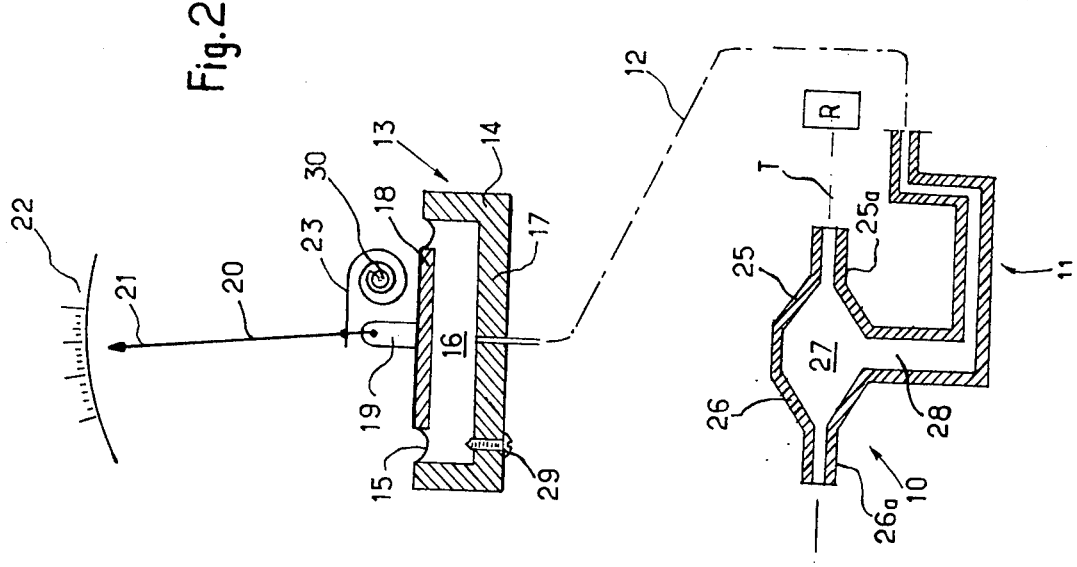

United States Patent [19]

Sejournet

[11] 4,048,855
[45] Sept. 20, 1977

[54] LIQUID LEVEL GAUGE PARTICULARLY FOR MOTORCYCLE

[76] Inventor: Jerome Sejournet, 53, rue du Ranelagh, 75016 Paris, France

[21] Appl. No.: 727,154

[22] Filed: Sept. 27, 1976

[30] Foreign Application Priority Data

Sept. 29, 1975 France .............................. 75.29757

[51] Int. Cl.$^2$ ........................................... G01F 23/16
[52] U.S. Cl. ..................................... 73/299; 73/406
[58] Field of Search ................. 73/299, 303, 302, 406, 73/4 R; 116/118 R

[56] References Cited

U.S. PATENT DOCUMENTS

| 1,905,172 | 4/1933 | Howse | 73/303 |
| 1,711,236 | 4/1929 | Mapel | 73/303 |
| 1,840,648 | 1/1932 | Wheeler | 73/303 X |
| 3,163,529 | 12/1964 | Jewett | 73/406 |
| 3,832,901 | 9/1974 | Girvin | 116/118 R |

FOREIGN PATENT DOCUMENTS 259,218  6/1927  United Kingdom ................. 73/303

*Primary Examiner*—Daniel M. Yasich
*Attorney, Agent, or Firm*—Walter M. Rodgers

[57] ABSTRACT

A petrol gauge for motorcycle is disclosed making use of the pressure existing at the bottom portion of the petrol tank. It comprises a display needle, the position of which depends on the position of a diaphragm of a pressure gauge device connectable with the tank, said pressure gauge device being made of a chamber sealed off by the diaphragm and by a removable plug at the bottom of the chamber, means being provided for preliminary calibration both at full and empty load of the tank.

4 Claims, 2 Drawing Figures

LIQUID LEVEL GAUGE PARTICULARLY FOR MOTORCYCLE

This invention has for its object a liquid level gauge, particularly a petrol gauge for motorcycle.

Most motorcycles, that is motorbikes as well as light and heavy motorcycles, are not provided with petrol gauges and; while there exists on motorcycles means which the driver can operate to resort to a petrol reserve, the absence of gauge is nevertheless a disadvantage for the users of such machines.

Moreover, owing to the special shape of motorcycle petrol tanks, shape which differs from one machine to another, it is not possible in a simple manner to equip a motorcycle or the like with a petrol gauge of usual type such as that used on cars, and which comprises a float connected to a display galvanometer through a measuring resistor.

It is thus an object of the present invention to provide a liquid level gauge, particularly a petrol gauge for motor cycles, which obviates the above mentioned drawbacks.

It is also an object of this invention to provide such a gauge adapted to be very easily mounted and without any danger on any type of motorcycle whatsoever.

A petrol gauge for motorcycle according to this invention which makes use of the pressure existing at the bottom portion of the petrol tank and comprising a display needle the position of which depends on the position of a diaphragm of a pressure gauge device connectable to the tank, is characterized in that said pressure gauge device comprises a chamber sealed off by the diaphragm and a removable plug at the bottom of the chamber to enable its filling with the petrol from the tank the indication representing the level of the petrol, —corresponding to the measured vacuum when the gauge is mounted on the handlebar of the motorcycle—, being provided by the display needle which is attached to a small plate carried by the diaphragm and which can be manually adjusted by means of a preliminary calibration for the O division of a scale when the tank is empty and for the maximum division of said scale when the tank is full.

Figure 1:
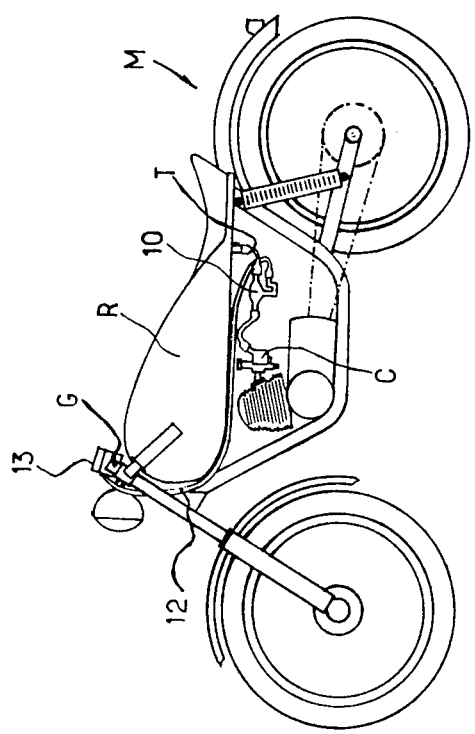

The invention will be more clearly understood from the following description given as an example and with reference to the accompanying drawing, in which:

FIG. 1 is a schematic view of a motorcycle equipped with a gauge device according to this invention; and FIG. 2 is a schematic drawing of a gauge device according to this invention.

A motorcycle, in the example described and illustrated a heavy weight motorcycle M, although this indication has no limitative character whatsoever, comprises a tank R connected to at least one carburetor C by means of a tubing T.

On the latter is interposed a take off or off tube member 10, FIG. 2, provided with a siphon 11 itself connected by means of a reduced section tube 12 to a pressure gauge device 13 secured higher than the lower portion of the tank R, for instance on the handlebar G of the motorcycle. The pressure gauge device 13 comprises a box or casing 14 defining with a deformable diaphragm 15, for example of elastomeric material, a sealed off compartment or chamber 16 into which opens the tubing 12. Onto the face of the diaphragm 15 opposite the bottom wall 17 of the casing 14 is secured a rigid small plate 18 with which is integral, outside chamber 16, a finger 19 activating a needle 20 and end 21 of which moves in front of a scale 22. Onto the needle 20 is attached a biasing spiral spring 23 which urges continuously the needle 20 away from the bottom wall 17 of the casing 14. A cover, not shown, and which enables the atmospheric pressure to act upon the diaphragm 15, carries the spring 23 through a rod 30 materialising the rotation axis of the needle 20, thus mounted in a frictionless manner. The tension of the spring 23 is easily adjustable from the outside of the pressure gauge device, for instance by means of a screw, not shown, and which is preferably coaxial with rod 30.

The operation of the petrol gauge according to the invention is the following:

When chamber 16 has been filled with petrol, in a manner hereafter explained, and when the pressure gauge device 13 is secured onto the handle bar G, the diaphragm 15 undergoes the action of the atmospheric pressure exerted on the small plate 18, the action of the petrol pressure existing inside the chamber 16 and the action of the biasing force of spring 23. When this latter force balances the difference between the atmospheric pressure and the pressure existing inside the chamber 16, the diaphragm is in equilibrium and the position of the needle 20 indicates on the scale 22 the level of petrol inside the tank.

In order to attenuate the pressure fluctuations due to the vibrations and to the trepidations of the machine, the tubing 12 connecting the take-off member 10 to the pressure gauge device 13 is of reduced section, whereas, in order not to vitiate the measurement by a dynamical pressure related to the flowing of the petrol between the tank R and the carburetor C, the take-off member comprises a diverging nozzle portion 25 connected with the tank R by means of a tube element 25a and a converging nozzle portion 26 connected with the carburetor C by means of a tube element 26a, both said nozzle portions defining a chamber 27 of a dimension such that the hydrodynamical pressure effect at the inlet point 28 of the siphon 11 is negligible.

The volume of the siphon 11 is moreover chosen large enough for air not to penetrate into the tubing 12 connecting said siphon to the pressure gauge device in case the machine runs out of petrol.

For mounting a gauge according to the invention onto a motorcycle, the take-off member 10 is first interposed between the tank R and the carburetor C on the tubing T, causing the two tube elements 25a and 26a to cooperate with two sections of said tubing. Account being taken of the fact that the latter is substantially of the same diameter for different types of motorcyles, in particular heavy weight motor cycles, a same take-off member 10 is suitable for the mounting of a gauge according to this invention onto any motorcycle model whatsoever. After positioning of member 10, the gauge is rid of air, most simply by opening a screw 29 provided in the bottom wall 17 of the casing 14 and by enabling petrol to fill the chamber 16 while the pressure gauge device 13, not yet secured onto the handlebar G is placed at a level lower than the lowest point of the tank. When the chamber 16 is full of petrol, the screw 29 is put back into place into the lower wall 17 of the casing 14 and the pressure gauge device 13 is secured at the desired place on the handlebar G. The tank R is then completely emptied and the force of the biasing spring 23 is adjusted in such a manner that the needle 21 indicates zero on the scale 22.

Account is thus taken of the differences in height which can exist between the lowest point of the tank and the diaphragm 15, differences in height due, on the one hand, to the location of the pressure gauge device 13 on the handlebar G, and on the other hand, to the particular shape of the motorcycle tank.

Good results have been obtained with a gauge according to this invention comprising a tube 12 the internal diameter of which was slightly less than 1 mm whereas the diameter of the chamber 27, in its greater dimension, was in the order of 10 mm.

What I claim is:

1. A gasoline gauge, particularly for a motorcycle, for measuring the level of gasoline contained in a fuel tank, said gauge comprising a pipe line linking the lower portion of the tank and at least one carburetor, a take-off member formed in said pipe line and linked by siphon to a tube filled with gasoline when the gauge is in use, said siphon being effective to prevent passage of air into said tube when the tank is empty and said tube having a cross section sufficiently small so as effectively to attenuate pressure fluctuations due to vibrations, a pressure gauge device including a fluid-tight chamber, a wall of which includes a movable diaphragm, said chamber being linked to said tube, a removable plug arranged to close an opening in said chamber to facilitate the filling thereof with gasoline from the tank, and a display needle attached to a small plate carried by the diaphragm and adjustable by a preliminary calibration on a zero division of an indicating scale when the tank is empty.

2. A gasoline gauge according to claim 1 further comprising a spiral biasing spring one extremity of which is attached to said needle and the other extremity of which is attached to adjustable means in order to modify the indications of the needle.

3. A gasoline gauge according to claim 1 wherein the take-off member comprises a diverging nozzle adapted to be connected to said tank and a converging nozzle adapted to be connected to at least one carburetor of the motorcycle.

4. A gasoline gauge according to claim 3 wherein the tube connecting the take-off member of the pressure gauge device has for at least part of its length an internal diameter less than 1 mm, and wherein the take-off member is of larger dimension of the order of 10 mm at its greater width.

* * * * *